(12) United States Patent
Shih et al.

(10) Patent No.: US 8,905,470 B2
(45) Date of Patent: Dec. 9, 2014

(54) SEAT WITH DINING BOARD AND DISPLAY DEVICE

(71) Applicants: Henry Shih, Yun-Lin County (TW); Wen-Ping Tsai, Yun-Lin County (TW); Chang-Hsien Lee, Yun-Lin County (TW)

(72) Inventors: Henry Shih, Yun-Lin County (TW); Wen-Ping Tsai, Yun-Lin County (TW); Chang-Hsien Lee, Yun-Lin County (TW)

(73) Assignee: Super Alloy Industrial Co., Ltd., Yun-Lin County (TW)

( * ) Notice: Subject to any disclaimer, the term of this patent is extended or adjusted under 35 U.S.C. 154(b) by 102 days.

(21) Appl. No.: 13/652,547

(22) Filed: Oct. 16, 2012

(65) Prior Publication Data

US 2014/0077533 A1    Mar. 20, 2014

(30) Foreign Application Priority Data

Sep. 14, 2012   (TW) .............................. 101133647 A (51) Int. Cl.
*A47B 83/02* (2006.01)
*A47B 39/00* (2006.01)
*A47C 7/62* (2006.01)

(52) U.S. Cl.
USPC ....................... 297/163; 297/146; 297/188.04

(58) Field of Classification Search
CPC .. B60N 3/004; B64D 2011/0679; A47C 7/70; B61D 33/00
USPC .............................. 297/146, 163, 169, 188.04
See application file for complete search history.

(56) References Cited

U.S. PATENT DOCUMENTS

| 6,814,404 | B2 * | 11/2004 | Jensen | 297/146 |
| 6,994,401 | B1 * | 2/2006 | Fischer et al. | 297/452.14 |
| 7,621,593 | B2 * | 11/2009 | Dickinson | 297/163 |
| 8,141,948 | B2 * | 3/2012 | Cassellia et al. | 297/217.3 |
| 8,540,309 | B2 * | 9/2013 | Berger et al. | 297/163 |
| 2011/0298250 | A1 * | 12/2011 | Line et al. | 297/163 |
| 2013/0093220 | A1 * | 4/2013 | Pajic | 297/163 |

* cited by examiner

*Primary Examiner* — David R Dunn
*Assistant Examiner* — Jody Giacoman
(74) *Attorney, Agent, or Firm* — Rosenberg, Klein & Lee (57) ABSTRACT

A seat unit includes a seat and a dining board is slidably and pivotably connected to the back of the backrest of the seat. A display device such as a flat-board computer, a table PC, or an In-Flight Entertainment device, is connected to the bottom face of the dining board. The dining board is connected with two links which are pivotably connected to the legs of the backrest so that the dining board is pivoted and positioned horizontally. The dining board has operation members on two sides thereof so as to be slidably engaged with grooves in the reception member on the backrest. The dining board can be slid and stored in the reception member and the passenger behind the backrest can operate and enjoy the In-Flight Entertainment device.

9 Claims, 13 Drawing Sheets

SEAT WITH DINING BOARD AND DISPLAY DEVICE

FIELD OF THE INVENTION

The present invention relates to a seat, and more particularly, to a seat with a dining board slidably and pivotably connected to the back of the backrest of the seat. A display device is connected to the dining board.

BACKGROUND OF THE INVENTION

Figure 12:
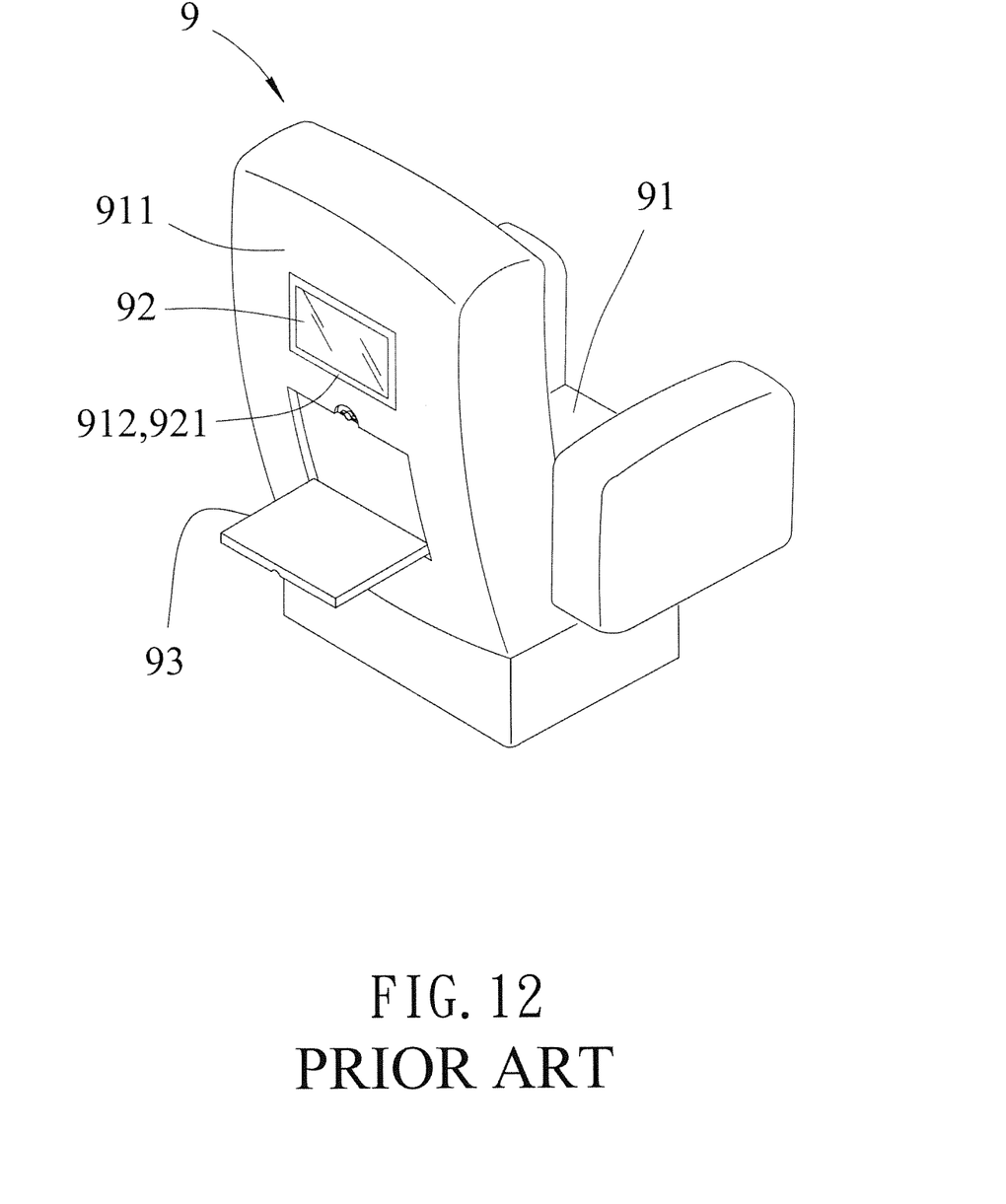
FIG. 12 shows the conventional on-board seat unit.

The conventional on-board seat such as the seat on planes or long-distance transportation vehicles, the seat has a display device for providing entertainment to the passenger. The conventional on-board seat 9 is disclosed in FIG. 12 and generally comprises a seat 91 and a backrest 911, and a display device 92 is connected to the back of the backrest 911 so that the passenger can use the display device 92 on the front seatback 911. The display device is engaged with a frame 921.

Figure 13:
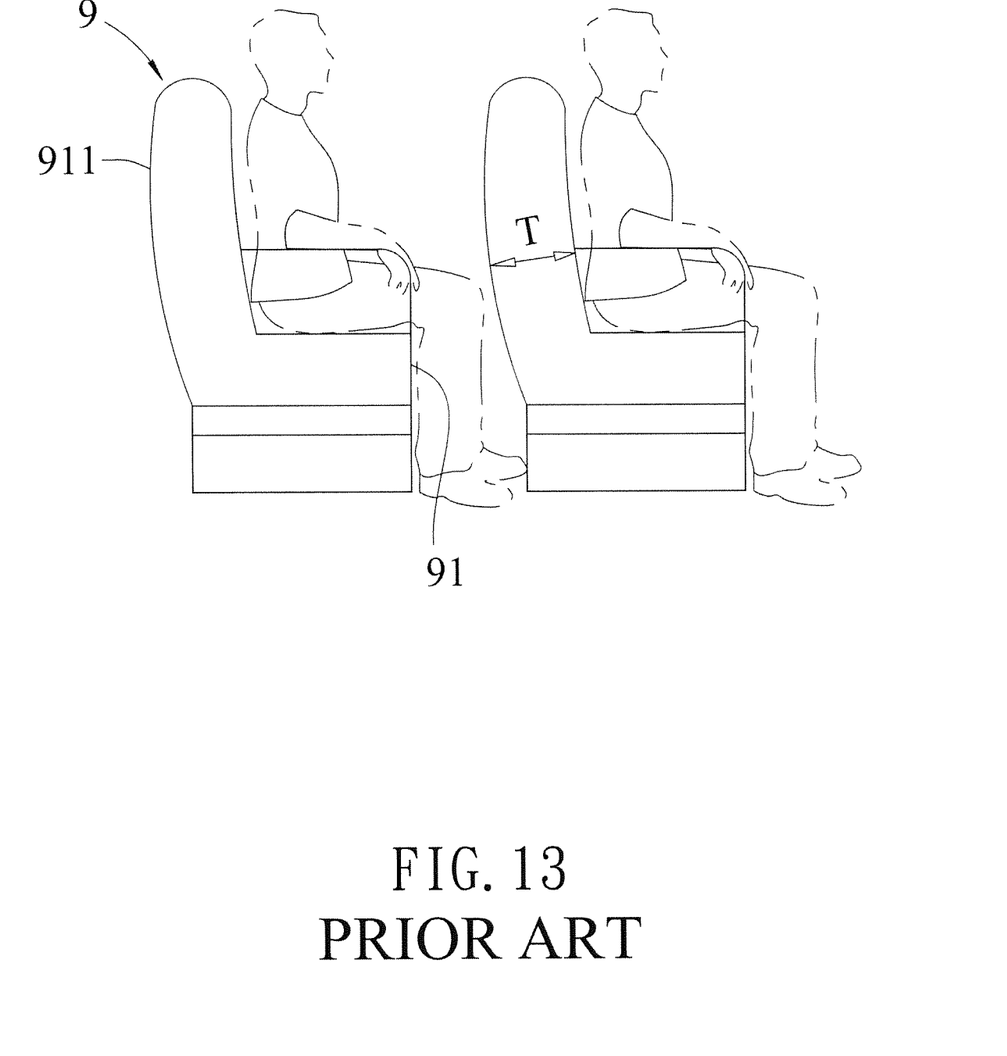
FIG. 13 shows that the leg space for the passenger behind the conventional seat unit is limited.

When a dining board 93 is added to the backrest 91, the dining board 93 and the display device 92 are respectively connected to the backrest 91, and this increases the assembling cost and the height of the backrest 91. The assembling steps are complicated for installing the dining board 93 and the display device 92. The thickness T of the backrest 91 is increased to accommodate the dining board 93 and the display device 92. Nevertheless, the thickness T reduces the leg space of the passenger behind the seat 9 as shown in FIG. 13.

The present invention intends to provide a seat with a dining board connected to the back of the backrest and the display device is connected to the dining board. The dining board is slidably up and down to increase the leg space of the passenger behind the seat.

SUMMARY OF THE INVENTION

The present invention relates to a seat unit and comprises a seat and a backrest. A dining board has a body and an engaging portion is located on a top face of the body. A reception member is connected to the backrest and has a recessed area defined therein. A hook is connected to the recessed area. Two grooves are respectively defined in two inner sides of the recessed area. A guide device has multiple operation members connected to the dining board and slidably engaged with the grooves of the recessed area so as to slide the dining board up and down. The reception member is located on the horizontal view level of the passenger behind the seat. The dining board is received in the recessed area of the reception member.

The primary object of the present invention is to provide a seat unit with the dining board slidably connected to the back of the backrest so as to provide more leg space for the passenger behind the seat. The dining board is positioned well and is not separated from the backrest due to vibration. The present invention is easily assembled.

The display device is a flat-board computer, table PC or an In-Flight Entertainment device which is connected to the bottom face of the dining board such that the leg space for the passenger behind the seat is increased.

The engaging portion of the dining board is hooked with the hook in the reception member to be positioned. The recessed area has a narrow portion on the top thereof such that the dining board can be securely positioned by the narrow portion.

The dining board and the display device are combined, and the seat and the backrest are another combination. The manufacturers easily assemble the seat unit with or without the combination of dining board and the display device. Therefore, the assembling and manufacturing costs are reduced.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the seat unit "A" of the present invention comprises a seat 6 and a backrest 61 connected to the seat 6.

Figure 1:
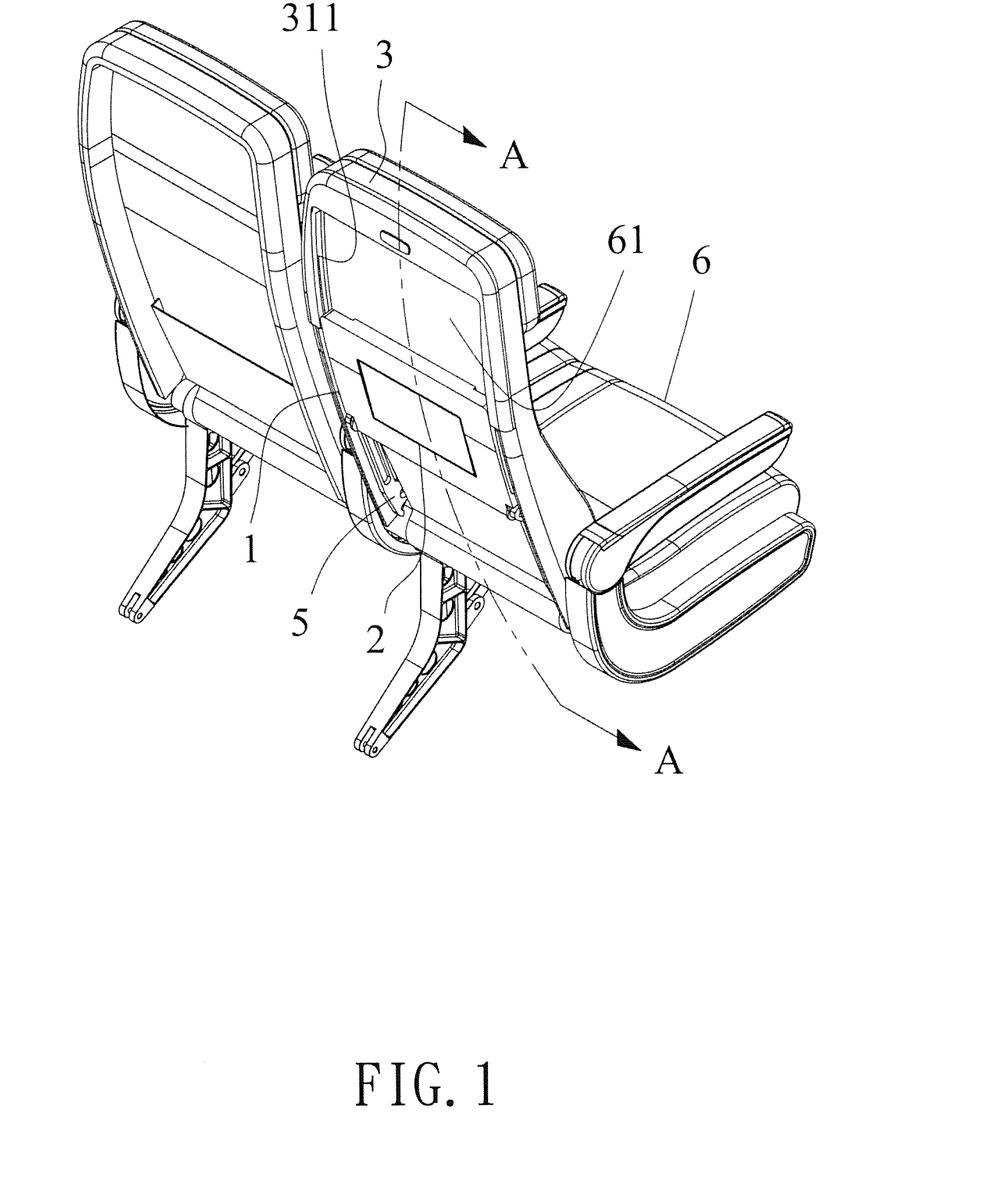
FIG. 1 is a perspective view to show two seat units of the present invention.
Figure 2:
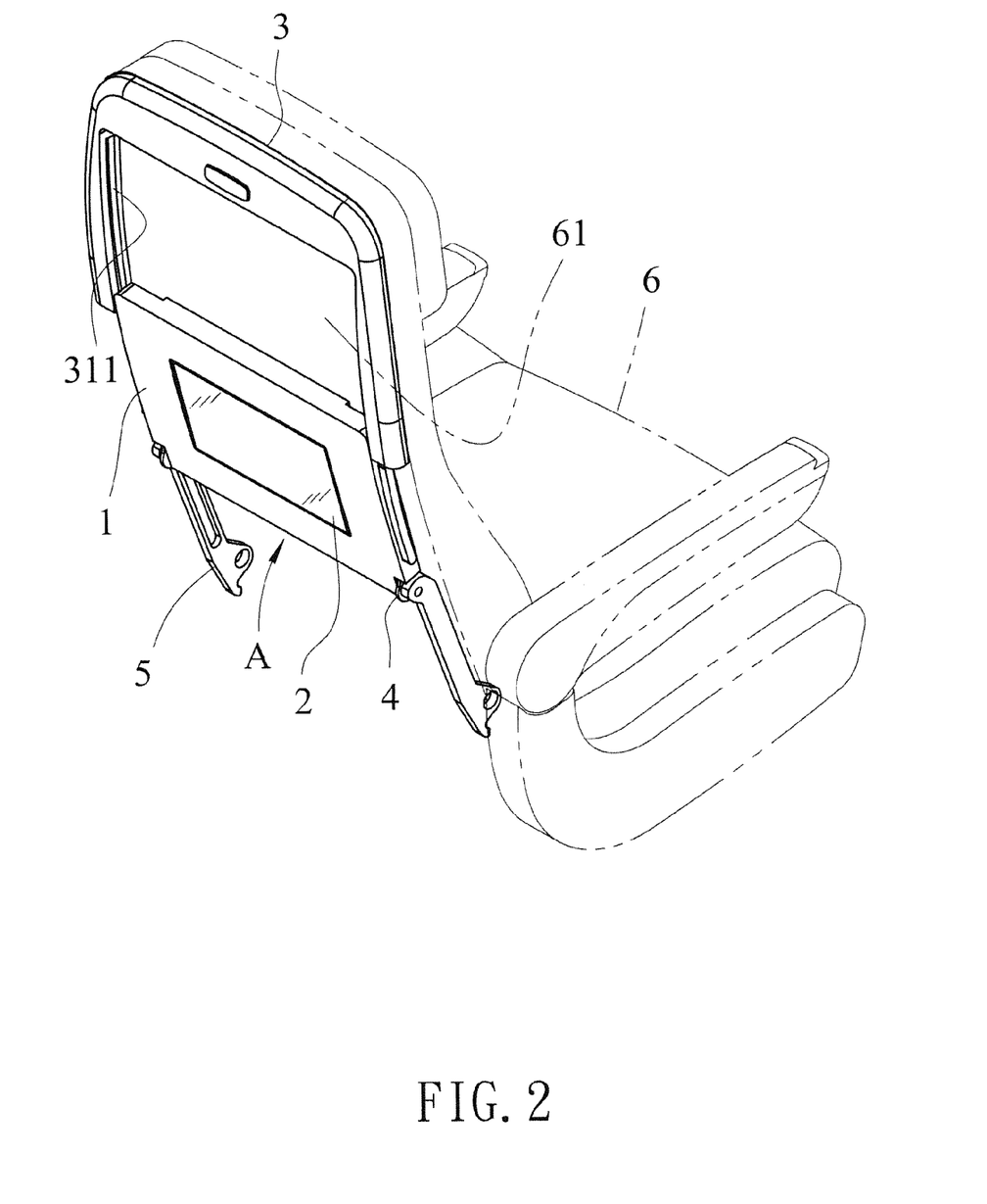
FIG. 2 is a perspective view to show the seat unit of the present invention.
Figure 3:
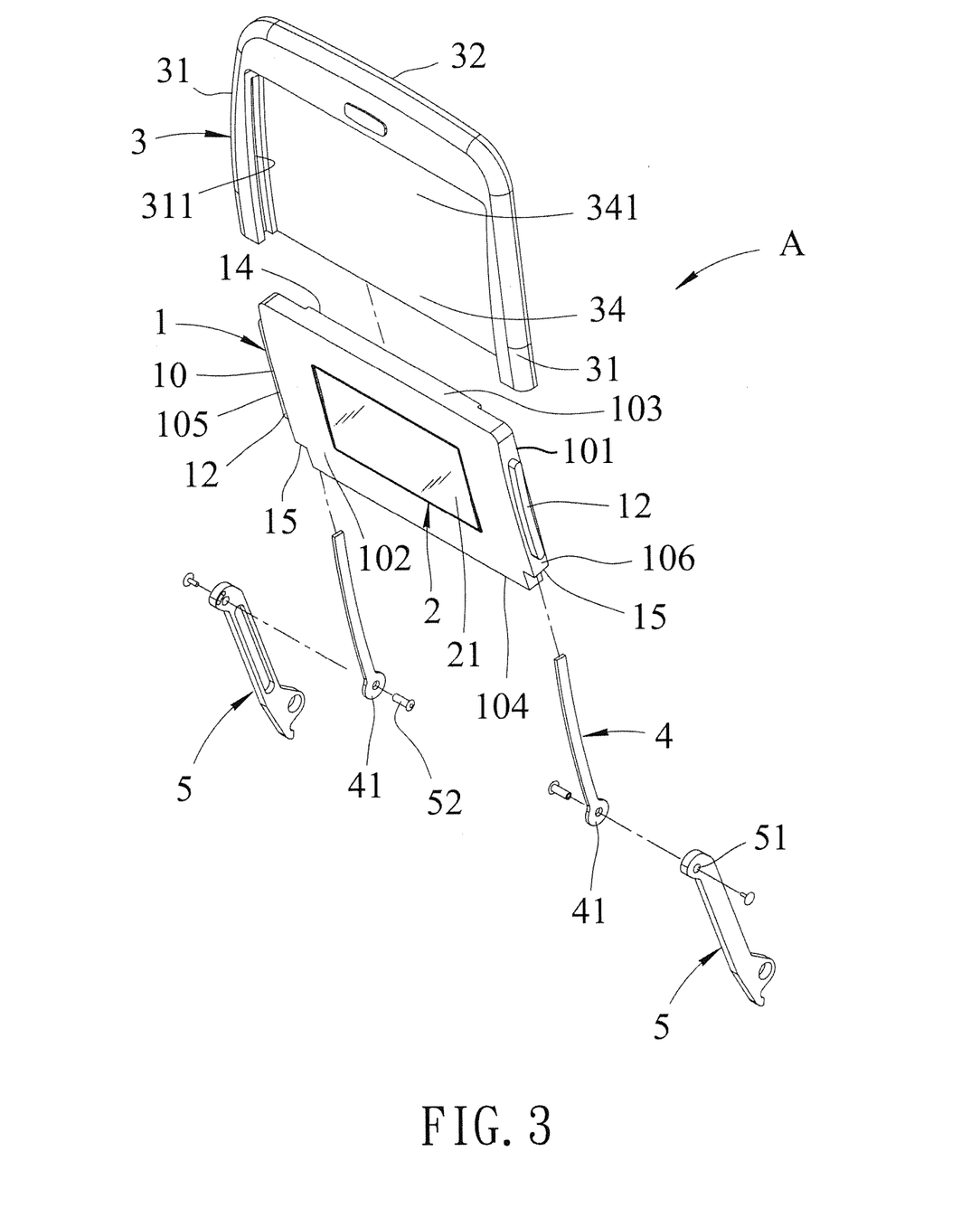
FIG. 3 is an exploded view to show the dining board and the guide device of the present invention, wherein the second guide unit are elongate members.
Figure 4:
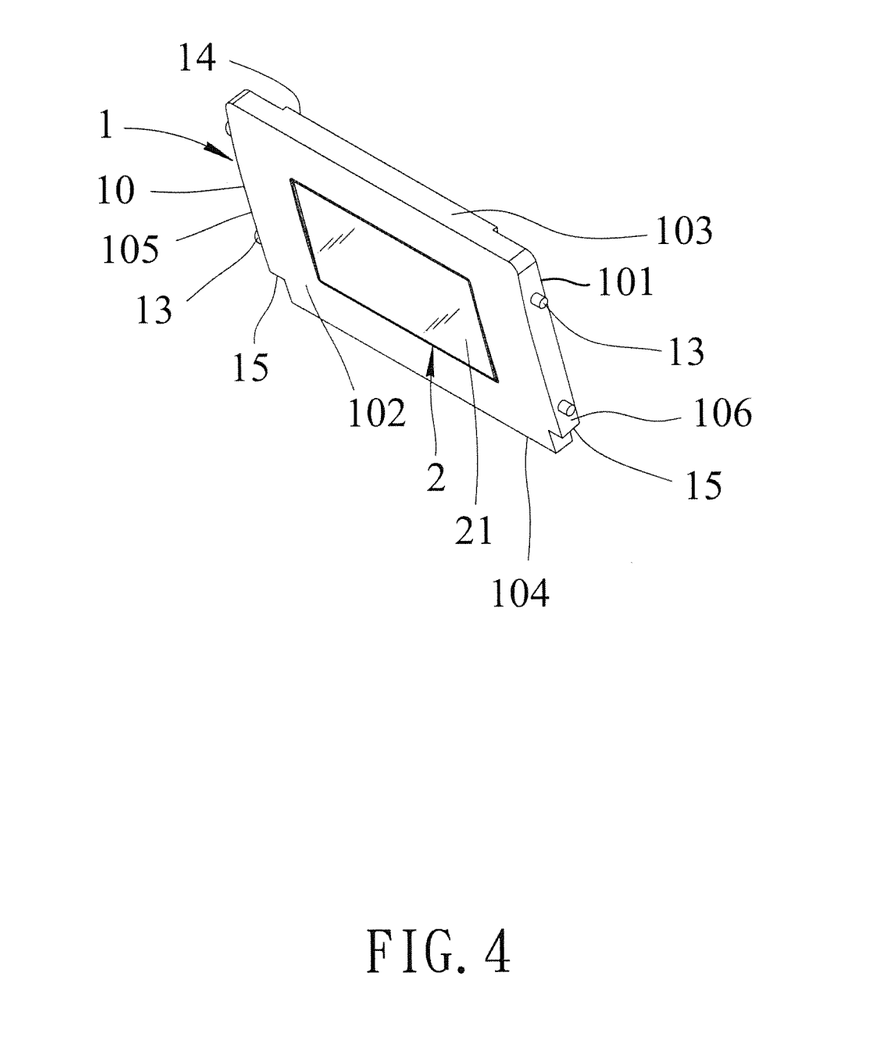
FIG. 4 is a perspective view to show the dining board of the present invention and the second guide unit are cylindrical members.

A dining board 1 has a body 10 which includes a top face 101, a bottom face 102, a top edge 103, a bottom edge 104, a left side 105 and a right side 106. The top face 101 faces upward and the bottom face 102 faces downward when the dining board 1 is positioned horizontally. Two slots 11 are defined from the bottom edge 104. A guide device includes a first guide unit 4 and a second guide unit, wherein the first guide unit 4 comprises two links which are inserted into the two slots 11 of the dining board 1. The second guide unit comprises operation members connected to the left and right sides 105, 106 of the dining board 1. The operation members can be elongate members 12 as shown in FIG. 3 or cylindrical members 13 as shown in FIG. 4. It is noted that the length "l" of each of the operation members 12 is shorter than the length "L" of the dining board 1, and preferably, the length "l" of each of the operation members 12 is within the range between ½ to ⅘ of the length "L" of the dining board 1.

A display device 2 is connected to the bottom face 102 of the dining board 1 and has a screen 21 which provides entertainment programs for the passenger behind the seat unit "A".

The display device 2 can be a flat-board computer, a table PC, an In-Flight Entertainment device, a multi-media video-audio device, an entertainment electronic device, a video-audio display device or a flat-board electronic display device.

A reception member 3 is connected to the backrest 61 and has a recessed area 34 which is defined by two lateral sides 31 and an engaging side 32 connected between the two lateral sides 31. Each of the lateral sides 31 has a groove 311 defined in the inner side thereof so that the operation members (the elongate members 12 or the cylindrical members 13) are received in the grooves 311. A hook 33 is connected to the mediate portion of the engaging side 32 of the recessed area 34. The recessed area 34 of the reception member 3 has a narrow portion 341 on a top end thereof.

The first guide unit 4 comprises the two links inserted into the two slots 11 of the dining board 1 and the two respective lower ends 41 of the two links are respectively and pivotably connected with pins 52 (as shown in FIG. 3) to two respective top ends 51 of two legs 5. The two legs 5 are connected to two recesses 62 of the backrest 61.

Figure 5:
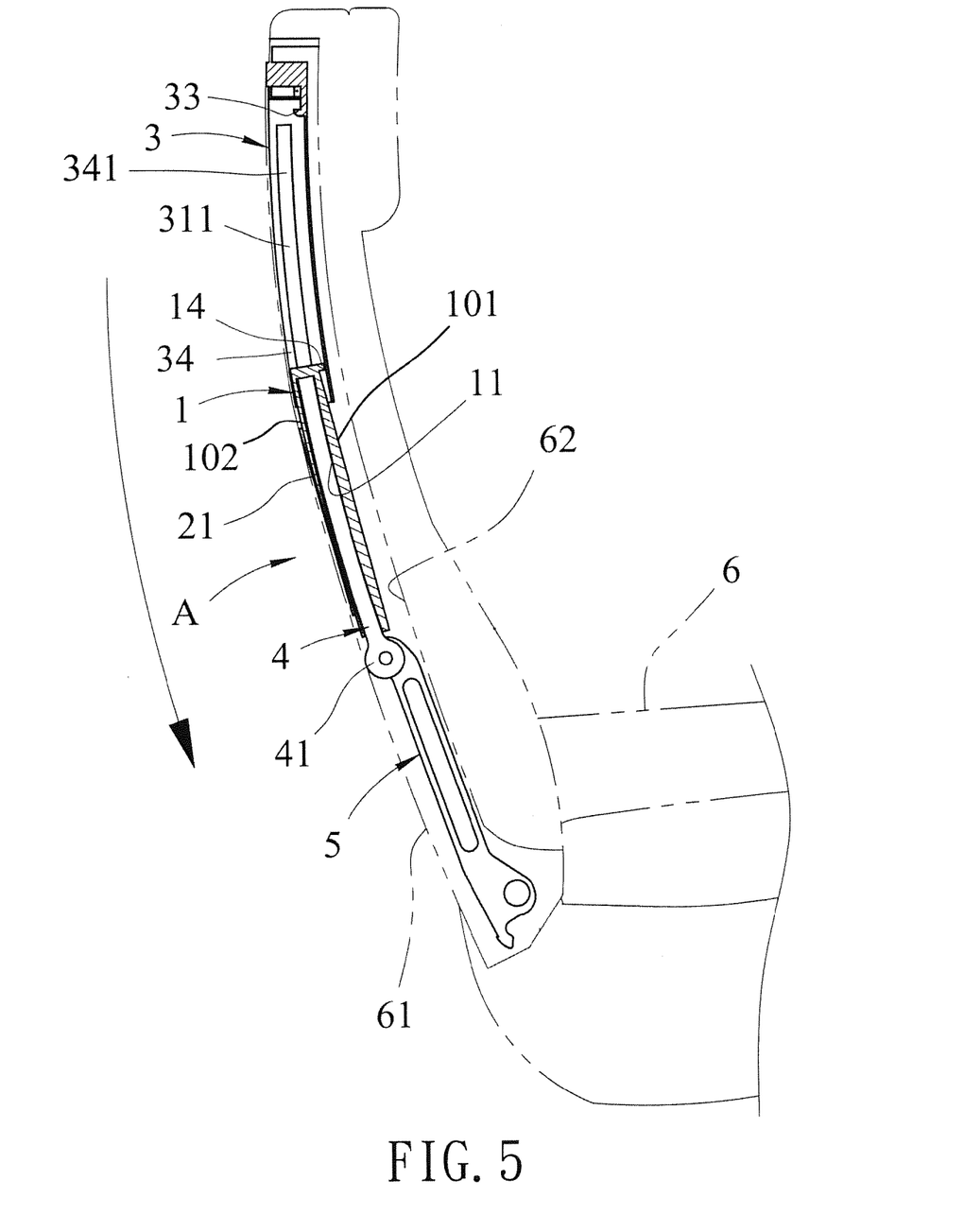
FIG. 5 is a cross sectional view, taken along line A-A in FIG. 1.

As shown in FIGS. 3 and 5, when assembling, the two links are respectively inserted into the two slots 11 of the dining board 1 and the two respective lower ends 41 of the two links are respectively and pivotably connected to two respective top ends 51 of two legs 5. The second guide unit comprises operation members connected to the left and right sides 105, 106 of the dining board 1. The operation members are received in the grooves 311. The dining board 1 has two notches 15 respectively defined in two lower corners thereof, and the two top ends 51 of the legs 5 and the lower ends 41 of the links of the first guide unit 4 are located in the two notches 15. By the two links of the first guide unit 4, the dining board 1 can be slid upward and downward.

Figure 6:
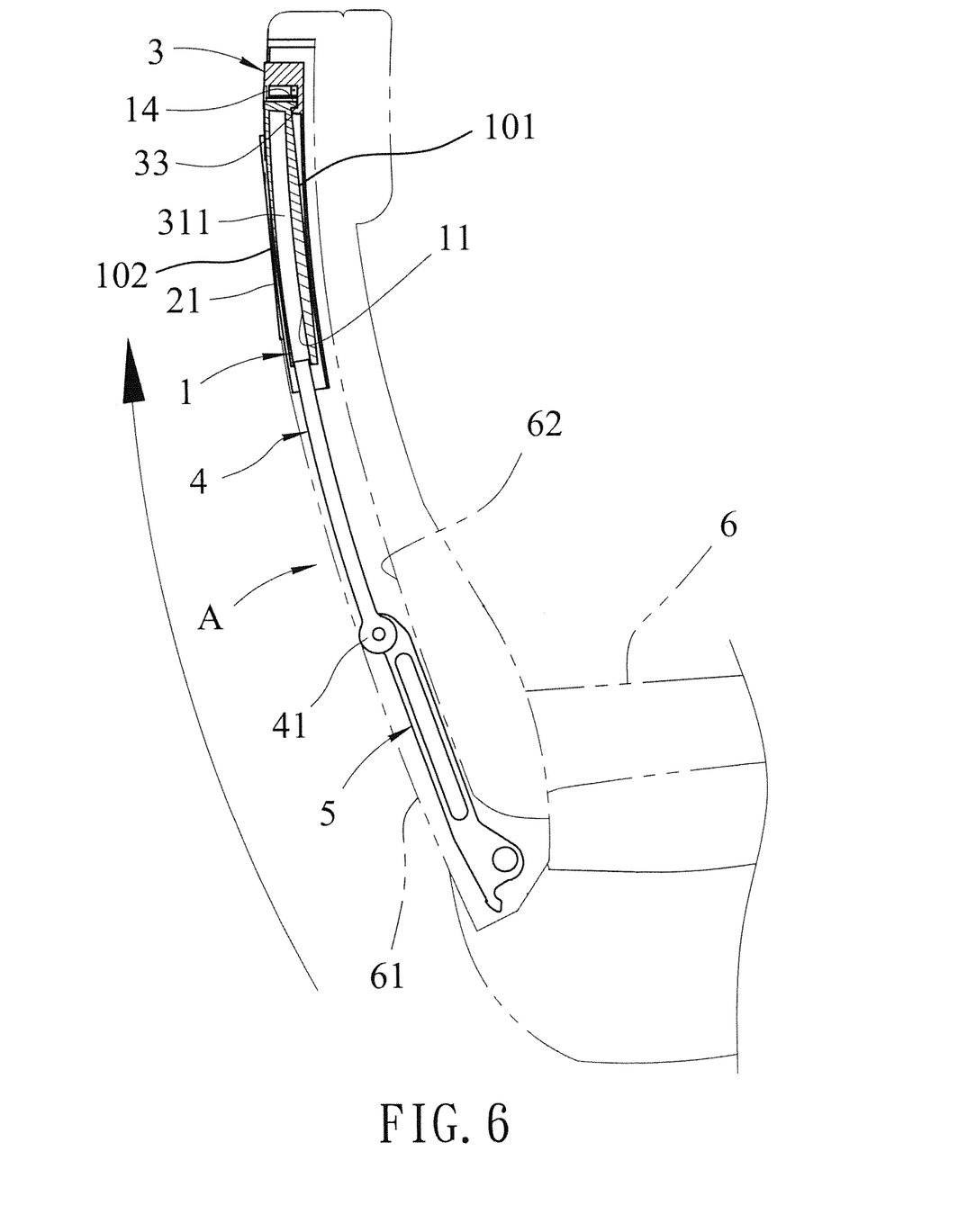
FIG. 6 is a cross sectional view to show that the dining board is slid upward.
Figure 10:
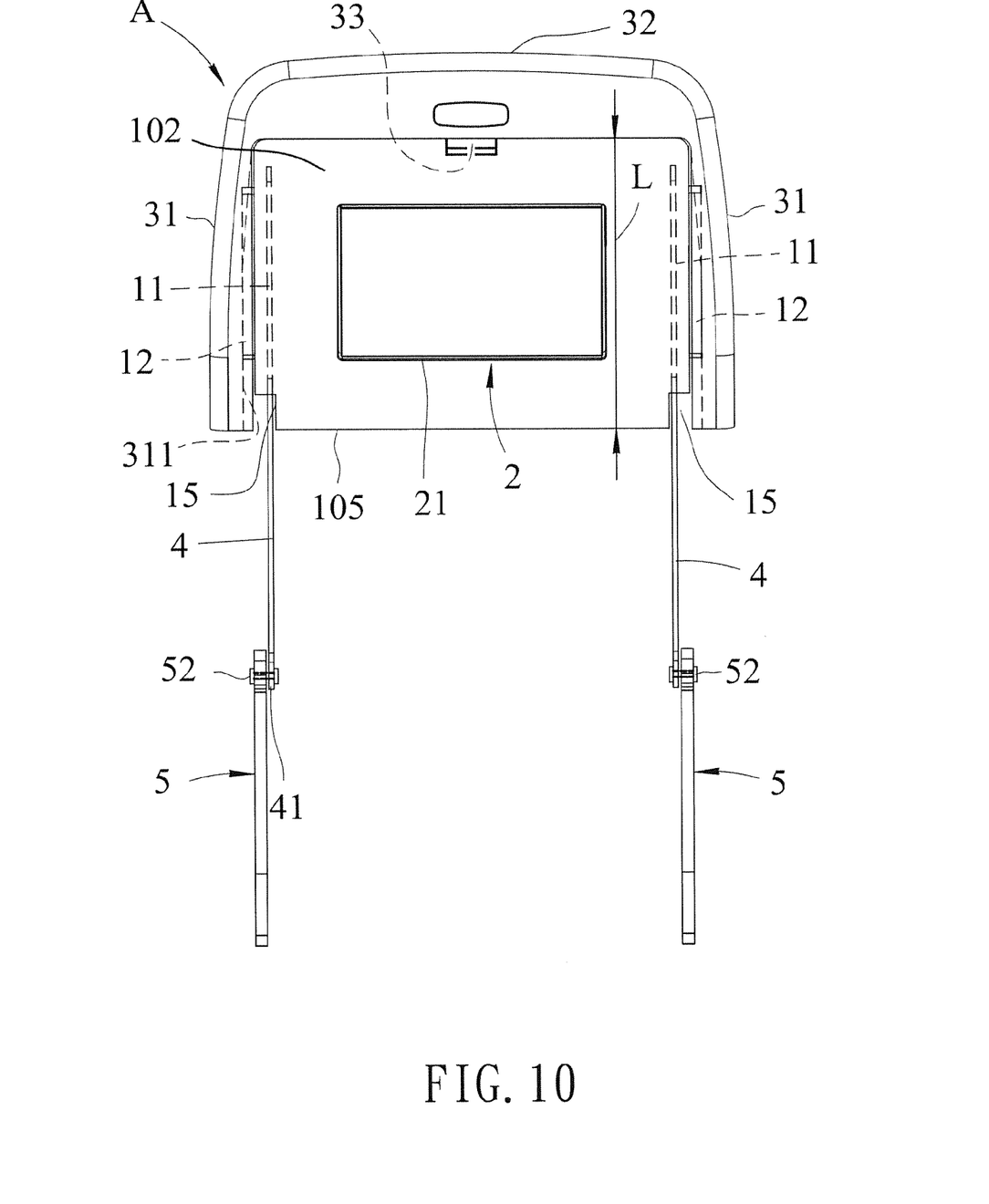
FIG. 10 shows that the dining board is slid upward and received in the reception member.

As shown in FIGS. 6 and 10, the dining board 1 is positioned at the high position where the engaging portion 14 is connected to the hook 33 of the reception member 3, and the reception member 3 is located on the horizontal view level of the passenger behind the seat 6. In other words, the display device 2 in the dining board 1 is located on the horizontal view level of the passenger behind the seat 6.

Figure 7:
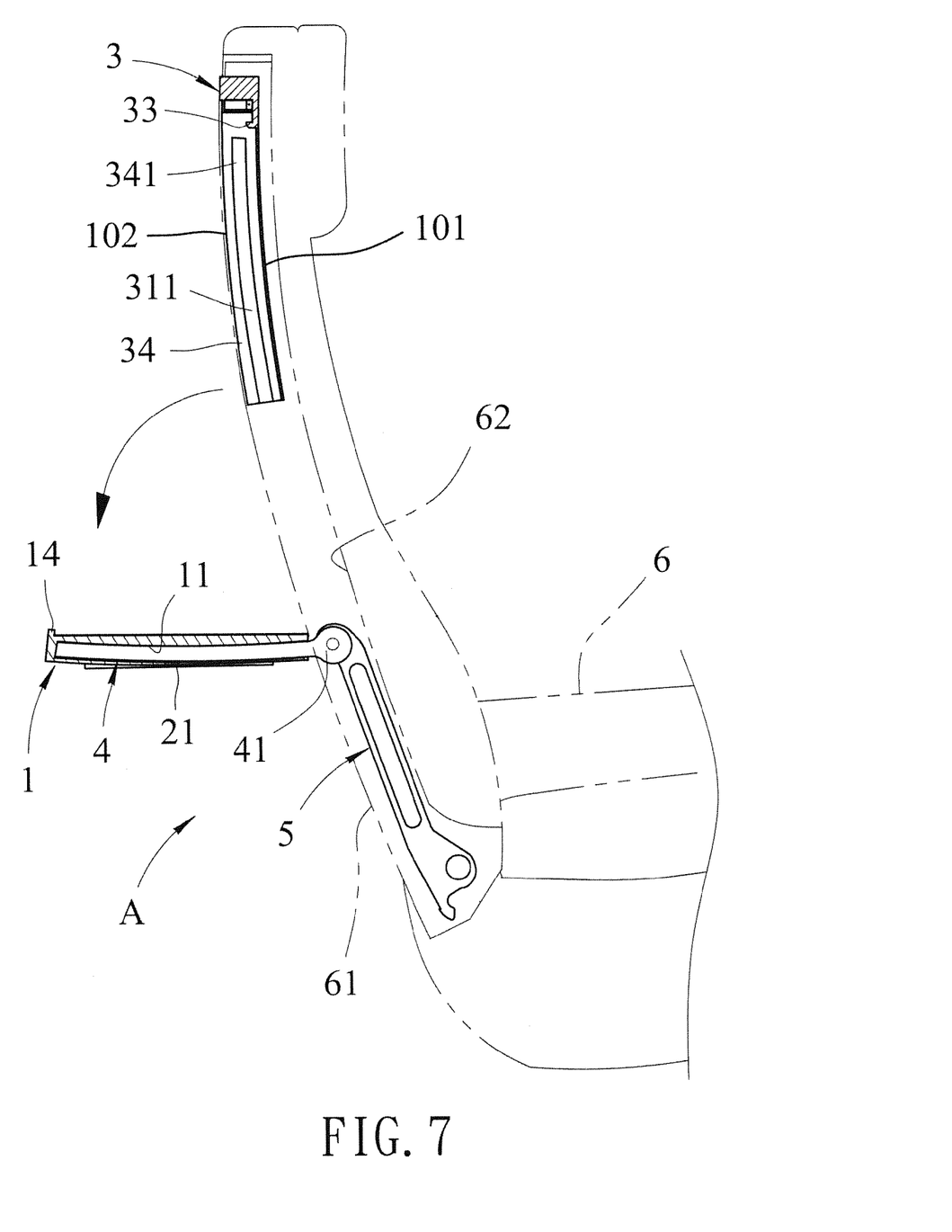
FIG. 7 is a cross sectional view to show that the dining board is pivoted and positioned horizontally.
Figure 8:
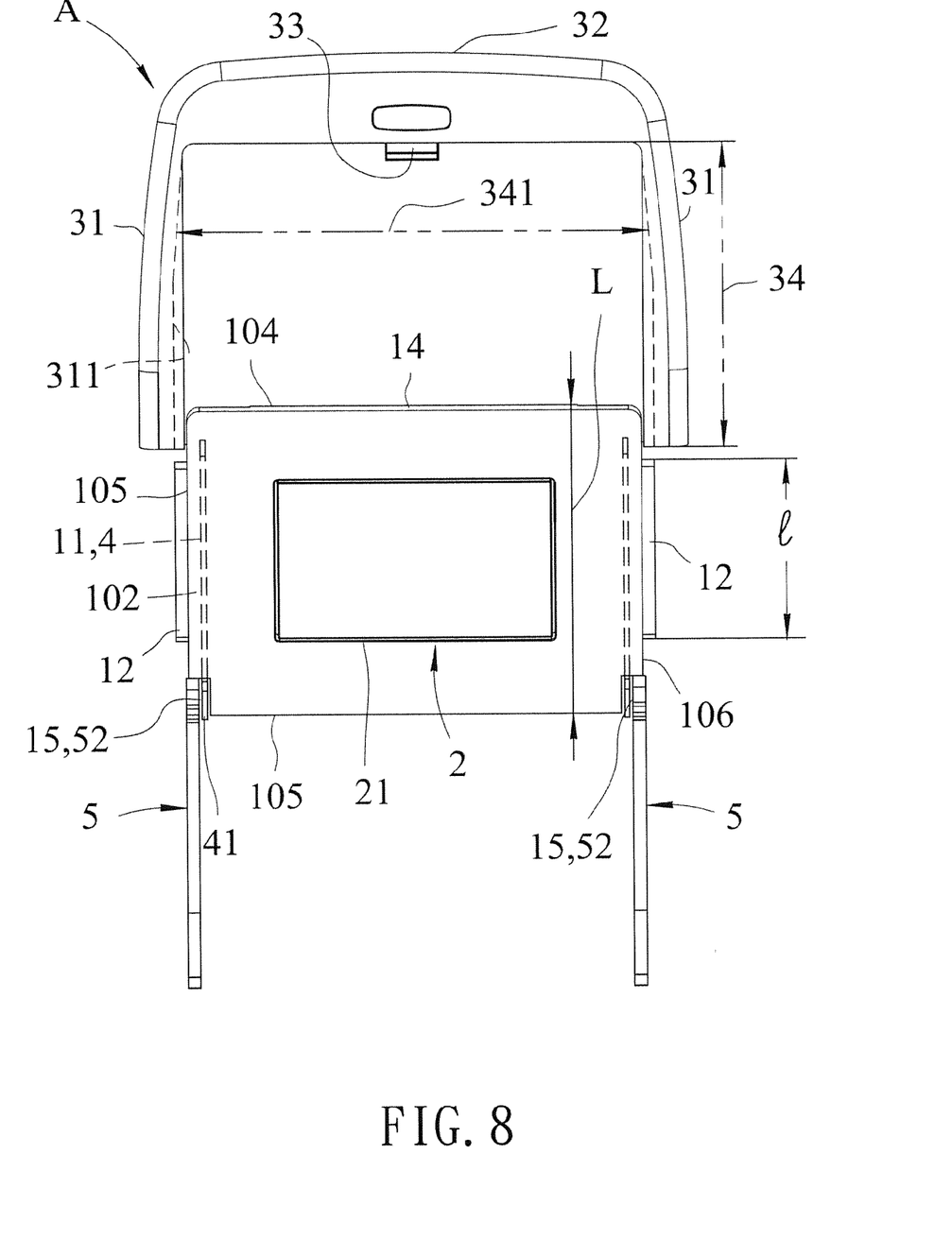
FIG. 8 is a plane view to show that the dining board with the elongate members is to be slid into the grooves of the reception member.
Figure 9:
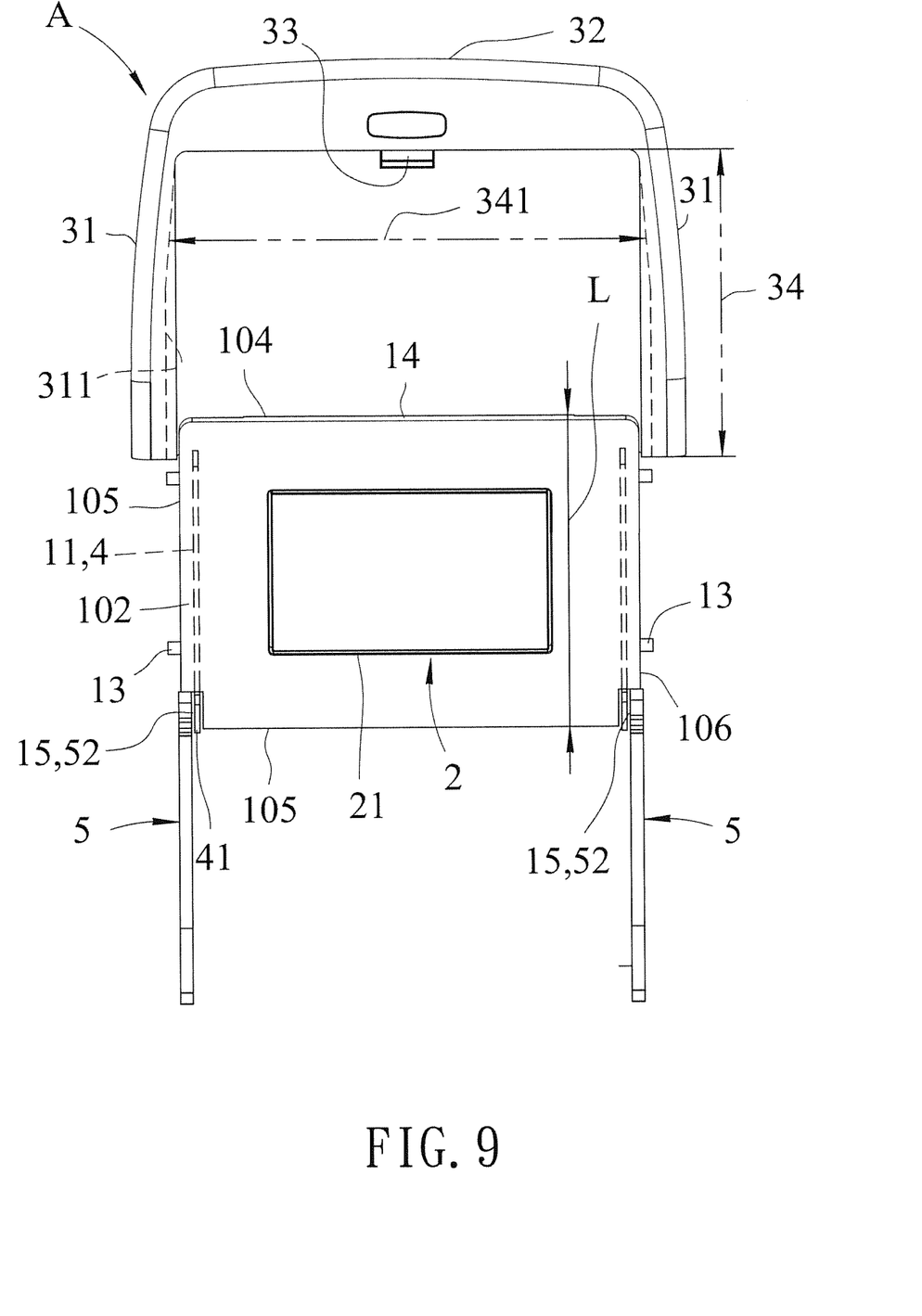
FIG. 9 is a plane view to show that the dining board with the cylindrical members is to be slid into the grooves of the reception member.
Figure 11:
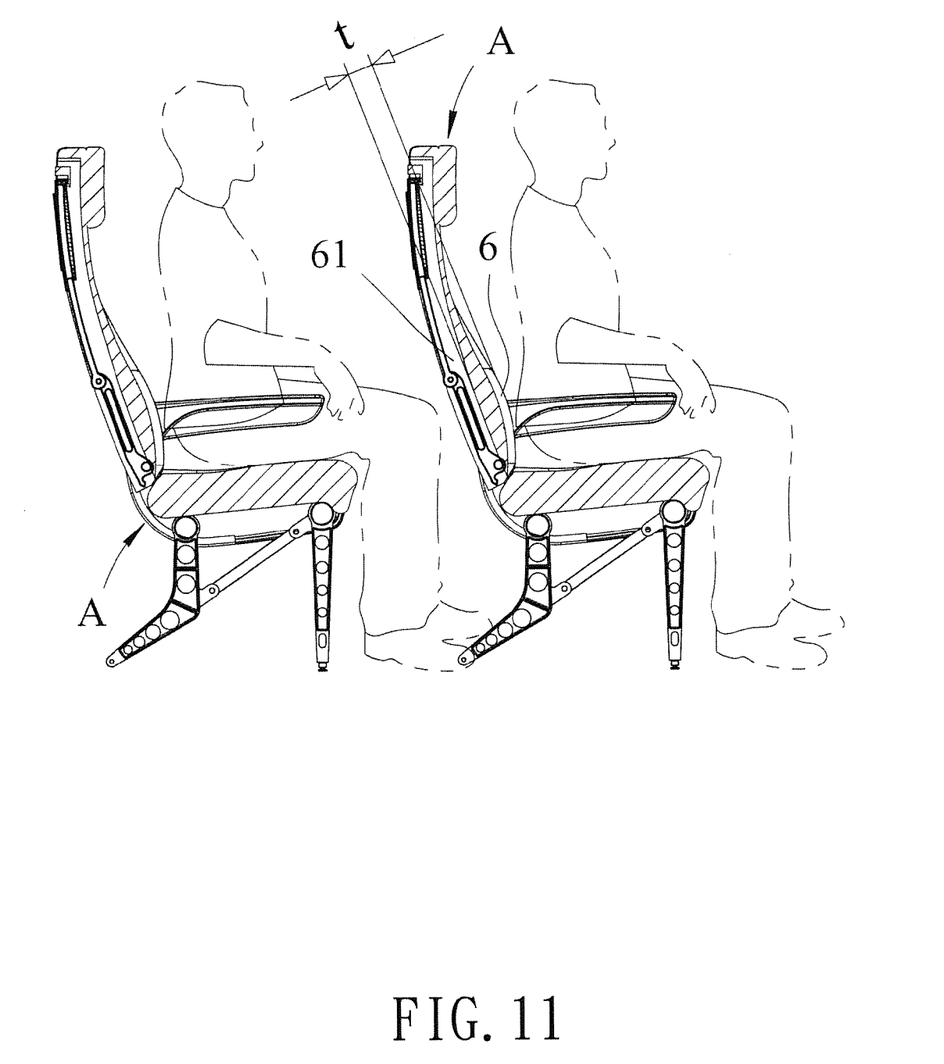
FIG. 11 shows that the leg space for the passenger behind the seat unit of the present invention is increased.

Because the dining board 1 together with the display device 2 can be slid upward and received in the recessed area 34, so that the thickness of combination of the dining board 1 and the reception member 3 is larger than the thickness "t" of the backrest 61 where two recesses 62 are defined. Therefore, the leg space for the passenger behind the seat unit "A" of the present invention is increased as shown in FIG. 11. As shown in FIGS. 7 to 9, when the passenger behind the seat unit "A" wants to read books or use the meal, the engaging portion 14 of the dining board 1 is unhooked from the hook 33 of the reception member 3, the dining board 1 is pulled downward along the grooves 311 and the links of the first guide unit 4 are completely inserted into the slots 11. The dining board 1 is able to be pivoted downward to its horizontal position as shown in FIG. 7. After the meal is used or the passenger wants to watch the entertainment programs, the dining board 1 is pivoted upward and slid upward along the grooves 311, the engaging portion 14 is hooked with the hook 33 again. The recessed area 34 has a narrow portion 341 on the top thereof, so that the dining board 1 can be securely positioned by the narrow portion 341 as shown in FIG. 10 so ensure that the dining board 1 does not separate from the reception member 3 by vibration.

While we have shown and described the embodiment in accordance with the present invention, it should be clear to those skilled in the art that further embodiments may be made without departing from the scope of the present invention.

What is claimed is:

1. A seat unit comprising:
a seat (6) and a backrest (61);
a dining board (1) having a body (10) and an engaging portion (14) located on a top face (101) of the body (10);
a reception member (3) connected to the backrest (61) and having a recessed area (34) defined therein and a hook (33) connected to the recessed area (34), two grooves (311) respectively defined in two inner sides of the recessed area (34), and
a guide device having multiple operation members connected to the dining board (1) and slidably engaged with the grooves (311) of the recessed area (34) so as to slide the dining board (1) up and down, the reception member (3) located on a horizontal view level of a passenger behind the seat (6), the dining board (1) being received in the recessed area (34) of the reception member (3);
wherein the operation members of the guide device comprises first guide unit (4) and a second guide unit, the first guide unit (4) comprises two links which are inserted into two slots (11) defined in the dining board (1), two respective lower ends (41) of the two links are respectively and pivotably connected to two respective top ends (51) of two legs (5), the two legs (5) are connected to two recesses (62) of the backrest (61), the second guide unit has the multiple operation members which are cooperated with the grooves (311) of the reception member (3), the multiple operation members are connected to a left side (105) and a right side (106) of the dining board (1).

2. The seat unit as claimed in claim 1, wherein the body (10) of the dining board (1) has a top face (101) and a bottom face (102), the top face (101) faces upward and the bottom face (102) faces downward when the dining board (1) is positioned horizontally, a display device (2) is connected to the bottom face (102).

3. The seat unit as claimed in claim 1, wherein
the operation members further include two cylindrical members (13).

4. The seat unit as claimed in claim 1, wherein the dining board (1) has two notches (15) respectively defined in two lower corners thereof, the two top ends (51) of the legs (5) and the lower ends (41) of the links of the first guide unit (4) are located in the two notches (15).

5. The seat unit as claimed in claim 1, wherein the operation members further include two elongate members (12).

6. The seat unit as claimed in claim 5, wherein a length of each of the operation members is shorter than a length of the dining board (1).

7. The seat unit as claimed in claim 6, wherein a length of each of the operation members is within a range between ½ to ⅘ of the length of the dining board (1).

8. The seat unit as claimed in claim 1, wherein the recessed area (34) of the reception member (3) has a narrow portion (341) on a top end thereof.

9. The seat unit as claimed in claim 1, wherein a thickness of the combined dining board (1) and the reception member (3) is greater than a thickness (t) of the backrest (61) where two recesses (62) are defined.

* * * * *